(12) United States Patent
Yanai

(10) Patent No.: US 7,046,171 B2
(45) Date of Patent: May 16, 2006

(54) VEHICLE SURROUNDING AREA IMAGE SYSTEM

(75) Inventor: Tatsumi Yanai, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 133 days.

(21) Appl. No.: 10/808,463

(22) Filed: Mar. 25, 2004

(65) Prior Publication Data
US 2004/0227647 A1 Nov. 18, 2004

(30) Foreign Application Priority Data
May 12, 2003 (JP) .............................. 2003-133670

(51) Int. Cl.
G08G 1/123 (2006.01)
(52) U.S. Cl. .............................. 340/995.1; 340/995.19; 340/995.24; 340/937; 701/208; 701/213
(58) Field of Classification Search ............. 340/995.1, 340/995.2, 995.19, 995.24, 937; 701/208, 701/209, 213
See application file for complete search history.

(56) References Cited
U.S. PATENT DOCUMENTS
6,424,273 B1 * 7/2002 Gutta et al. ................. 340/937
6,940,423 B1 * 9/2005 Takagi et al. ............ 340/932.2

FOREIGN PATENT DOCUMENTS
JP         2000-238594 A      9/2000
JP          2000238594 A  *   9/2000

* cited by examiner

Primary Examiner—Thomas J. Mullen, Jr.
Assistant Examiner—Travis R. Hunnings
(74) Attorney, Agent, or Firm—Shinjyu Global IP Counselors

(57) ABSTRACT

A vehicle surrounding area imaging system is configured to allow a driver to easily view and verify an image surrounding a peripheral side of the vehicle. The vehicle surrounding area imaging system basically has two cameras, a navigation system, a startup imaging determination unit and a monitor. The cameras take images of the areas to the sides of the vehicle to acquire images. The navigation system detects the current position of the vehicle. The startup imaging determination unit detects predetermined road regions that requires an image to be displayed from the periphery around the vehicle based on the current position detected by the navigation system as well as map information. The monitor selectively displays the images acquired by the cameras before the vehicle enters into one of the predetermined road region that requires an image display.

13 Claims, 10 Drawing Sheets

VEHICLE SURROUNDING AREA IMAGE SYSTEM

BACKGROUND OF THE INVENTION

1. Field of the Invention

The present invention relates to a vehicle surrounding area imaging system that determines whether or not to display an image or image of a side of one's own automobile.

2. Background Information

Conventionally, technology that displays images of the rear side of one's own automobile is known. One example of such conventional technology is disclosed in Japanese Laid-Open Patent Publication No. 2000-238594. In this technology, a determination is made as to whether or not one's own automobile has entered into a region that requires an image display, that requires a display of an applicable image, (for example, an intersection) based on the driving actions of a driver.

When the determination is made that one's own automobile has entered into the region that requires an image display, the technology photographs the rear side of one's own automobile to acquire an image of the rear side of the automobile and then displays the acquired image in a monitor inside the automobile cabin. This makes it possible for the driver of one's own automobile to view the image and verify the conditions at the rear sides of one's own automobile.

In view of the above, it will be apparent to those skilled in the art from this disclosure that there exists a need for an improved vehicle surrounding area imaging system. This invention addresses this need in the art as well as other needs, which will become apparent to those skilled in the art from this disclosure.

SUMMARY OF THE INVENTION

It has been discovered that in this technology, when one's own automobile actually enters into the region that requires an image display, images of the sides of one's own automobile are often displayed. Consequently, the problem points shown below were encountered. In other words, when one's own automobile actually enters into the region that requires an image display, the driver is concentrating on driving the automobile and not on the image being displayed. Because of this, there was a problem of the driver having trouble viewing the image.

The present invention intends to solve this type of conventional problem. One object of the present invention is to provide a vehicle surrounding area imaging system that allows a driver to easily view and verify images of road conditions.

In accordance with one aspect of the present invention, a vehicle surrounding area imaging system is provided that basically comprises an image acquiring device, a position detecting device, a startup imaging device and an image displaying device. The image acquiring device is configured and arranged to acquire images of peripheral side areas of a vehicle equipped with the vehicle surrounding area imaging system. The position detecting device is configured and arranged to detect a current vehicle position of the vehicle. The startup imaging device is configured and arranged to detect predetermined road regions that require one of the images of the peripheral side areas of the vehicle to be displayed based on the current vehicle position detected by the position detecting device as well as map information. The image displaying device is configured and arranged to selectively display one of the images acquired by the image acquiring device before the vehicle enters into one of the predetermined road regions that was detected by the startup imaging device.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Generally, the present invention displays image information of the road conditions at least one of the peripheral sides of one's own automobile before one's own automobile enters into a predetermined road region that requires an image display of at least one of the peripheral sides of one's own automobile. In other words, before the driver concentrates on the driving actions in the predetermined road region that requires an image display of at least one of the peripheral sides of one's own automobile. This makes it possible for the driver of one's own automobile to view and verify images of the peripheral sides of one's own automobile before concentrating on the driving actions in the predetermined road region that requires an image display. As a result, the driver can more easily view and verify images of the sides of one's own automobile compared to conventional technology, which determines whether or not the automobile is in the predetermined road region that based on the driving actions of the driver. In other words, the driver can more easily verify the conditions at the peripheral sides of one's own automobile.

First Embodiment

Figure 1:
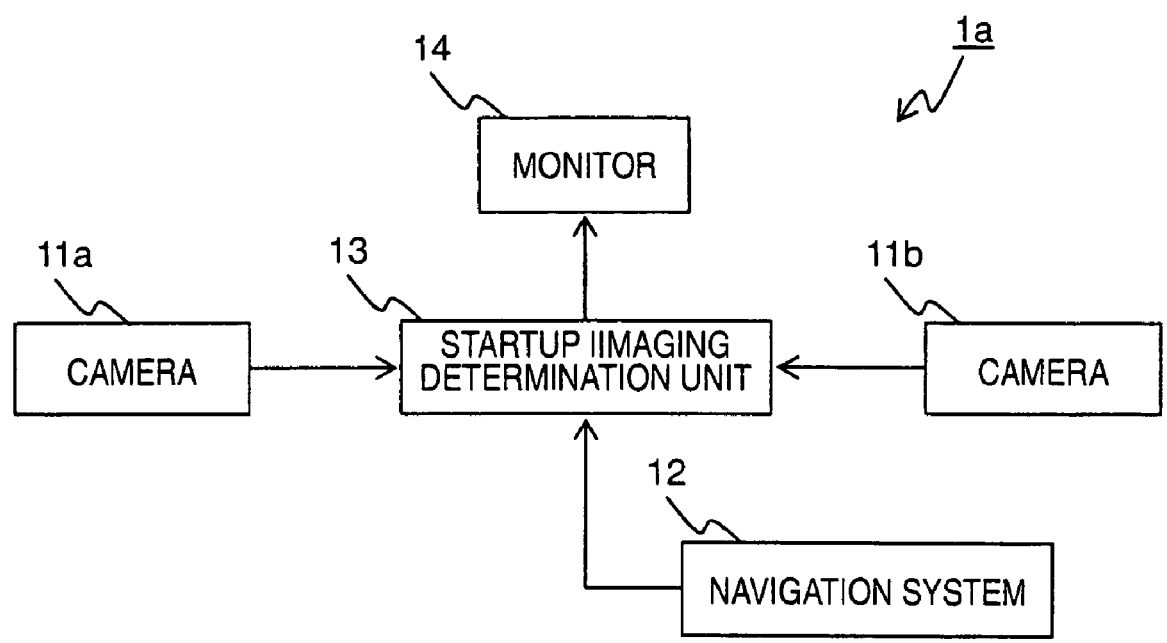
FIG. 1 is a block diagram showing main components of a vehicle surrounding area imaging system in accordance with a first embodiment of the present invention.

Referring initially to FIG. 1, a block diagram of the main components of a vehicle surrounding area imaging system 1a is illustrated in accordance with a first embodiment of the present invention. The vehicle surrounding area imaging system 1a is installed in one's own automobile or vehicle 100. The vehicle surrounding area imaging system 1a basically comprises a pair of cameras 11a and 11b, a navigation system 12, a startup imaging determination unit 13 and a monitor 14. The cameras 11a and 11b form an image acquiring device that is configured and arranged to photograph peripheral side areas of the vehicle 100 to acquire images of the peripheral side areas of the vehicle 100 that include the so called blind spot that is not covered by the mirrors of the vehicle. The navigation system 12 forms a position detecting device that is configured and arranged to a current position of the vehicle 100 that detects the current position of the vehicle 100. The startup imaging determination unit 13 forms a startup imaging determination device that is configured and arranged to detect predetermined road regions that requires an image to be displayed of the periphery around the vehicle 100 based on the current position detected by the navigation system 12 (position detecting device) as well as map information. The monitor 14 forms an image displaying device that is configured and arranged to display the images acquired by the cameras 11a and 11b (image acquiring device).

The navigation system 12 and the startup imaging determination unit 13 can be separate units or an integrated system that utilizes common components. The startup imaging determination unit 13 is a control unit that preferably includes a microcomputer with a startup imaging control program that controls the monitor 14 as discussed below. The startup imaging determination unit 13 also include other conventional components such as an input interface circuit, an output interface circuit, and storage devices such as a ROM (Read Only Memory) device and a RAM (Random Access Memory) device. The memory circuits store data, processing results and control programs such as ones for determining operation of the monitor 14 based on map information, the current vehicle position and image information. The startup imaging determination unit 13 is operatively coupled to the cameras 11a and 11b, the navigation system 12 and the monitor 14 in a conventional manner. The internal RAM of the startup imaging determination unit 13 stores statuses of operational flags and various control data. The internal ROM of the startup imaging determination unit 13 stores the predetermined or prescribe information for various operations. It will be apparent to those skilled in the art from this disclosure that the precise structure and algorithms for startup imaging determination unit 13 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Initially, the composition of the vehicle surrounding area imaging system 1a related to the first embodiment and the principal features of the compositional elements will be described by referring to FIGS. 1~10. Here, FIG. 1 is a block diagram showing the main components of the vehicle surrounding area imaging system 1a, while FIGS. 2~9 are top plan views showing examples of the predetermined road regions that require an image display. FIG. 10 is a top plan view illustrating an image displaying location that is a prescribed distance d1 prior to the predetermined road region that the vehicle is approaching.

Figure 2:
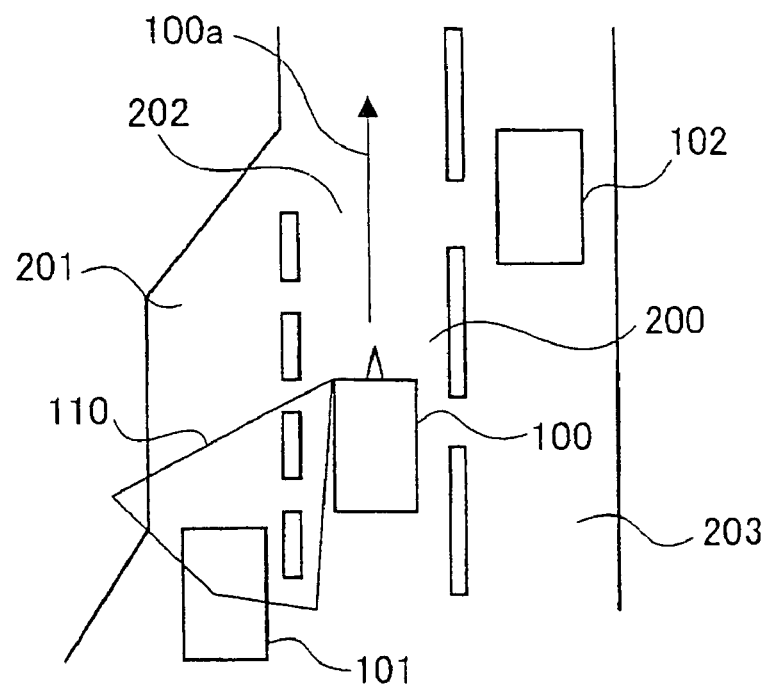
FIG. 2 is a top plan view showing an example of one of the predetermined regions that require an image display of the surrounding area of the peripheral side of the vehicle.

As shown in FIG. 2, the camera 11a photographs a region 110 at the left side of the vehicle 100 to acquire image information of the left peripheral side of the vehicle 100. Then, the image information that was acquired is output to the startup imaging determination unit 13 shown in FIG. 1.

Figure 3:
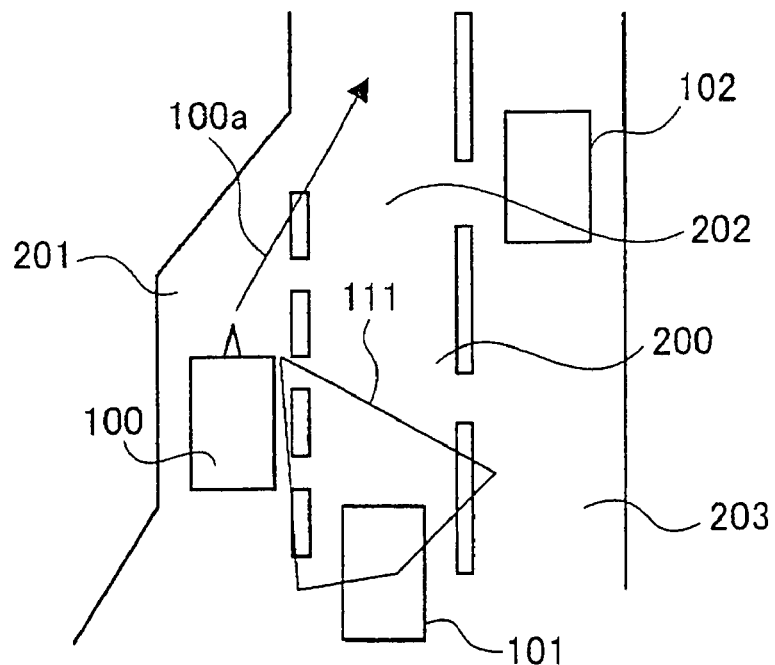
FIG. 3 is a top plan view showing an example of one of the predetermined regions that require an image display of the surrounding area of the peripheral side of the vehicle.

As shown in FIG. 3, the camera 11b photographs a region 111 at the right side of the vehicle 100 to acquire image information of the right peripheral side of the vehicle 100. Then, the image information that was acquired is output to the startup imaging determination unit 13 shown in FIG. 1.

The navigation system 12 uses GPS (Global Positioning System) to acquire current vehicle position information of the vehicle 100. In other words, the navigation system 12 is configured and arranged to detect the current vehicle position of the vehicle 100. The navigation system 12 also preferably includes prestored map information of the area where the vehicle 100 is being driven. Then, the current vehicle position information that was acquired and the map information are output to the startup imaging determination unit 13.

The navigation system 12 is further configured and arranged such that the driver can input a specific destination of the vehicle 100 that is outputted to the startup imaging determination unit 13. The navigation system 12 is further configured and arranged to set a specific route for the vehicle 100 to reach the inputted destination in response to the specified input operations (for example, input operations in which automobile passengers use input switches not shown in the figures). When the specific route is set, the applicable route information is generated for the route, and the route information is then outputted to the startup imaging determination unit 13.

The startup imaging determination unit 13 is further configured and arranged to detect predetermined road regions that require an image display of the peripheral side area of one's own automobile, based on the current vehicle position information and map information provided from the navigation system 12. When a predetermined road region that requires an image display is detected, the image displaying location d1 is determined for the predetermined road region that was detected as being approached by the vehicle 100 as shown in FIG. 10. The image displaying location d1 is a prescribed distance, such as 30 meters. Here in FIG. 10, a merge point 202, described later, is illustrated as an example of one of the predetermined road region that requires an image display. The image displaying location d1 is the point where the monitor 14 starts displaying at least one of the images of the peripheral side areas of the vehicle 100. Thus, the driver can view the peripheral side areas of the vehicle 100 prior to entering the merge point 202 (the predetermined road region). In FIG. 10, the beginning of the merge point 202 (the predetermined road region) is indicated by the startup location d2. At the startup location d2, the monitor 14 starts displaying one or more images that are determined by the particulars of the predetermined road region that the vehicle has entered. In other words, the image(s) on the monitor 14 can either remain the same, shift to new image(s) or the monitor can be turned off depending on the particulars of the predetermined road region.

Then, a determination will be made as to whether or not the vehicle 100 passed the image displaying location d1 that was detected based on the current position information and map information. When the result is that vehicle 100 passed the image displaying location d1, a determination will be made as to whether or not a specific route is uniquely specified by road configuration in the applicable region that requires an image display. When a specific route is uniquely specified by road configuration, the image information corresponding to the specified route will be output to the monitor 14.

In contrast, when a specific route is not uniquely specified by road configuration and route information is provided from the navigation system 12, the current route of the vehicle 100 will be recognized based on that route information, the current position information and map information such that image information corresponding to that recognized route will output to the monitor 14.

Further, when neither a specific route is uniquely specified by road configuration nor route information is provided from the navigation system 12, then the image information provided from both of the cameras 11a and 11b will output to the monitor 14. In other words, image information of both sides of the vehicle 100 will output to the monitor 14.

The monitor 14 is installed inside the cabin of the vehicle 100 and displays image information provided from the startup imaging determination unit 13. The monitor 14 is preferably configured and arranged to display multiple images at one time. Now, examples of predetermined road regions that require an image display will be described referring to FIGS. 2~9. The arrow 100a shown in FIGS. 2~9 indicates the current route of the vehicle 100.

As shown in FIGS. 2 and 3, a merge point 202 is included as one of the predetermined road regions that require an image display to assist the driver in passing through the predetermined road region. This merge point 202 merges the road 200 (e.g., main road or principal trunk road of an expressway) and a road 201 (e.g., acceleration lane that merges a main road of an expressway or a feeder road that merges with a principal trunk road) that merges with one part of the road 200 to form one road. The reason the merge point 202 is included in the predetermined road regions that require an image display is as follows. As shown in FIG. 2, when the vehicle 100 enters the merge point 202 from the road 200, there is a chance that another automobile 101, traveling on the road 201, may enter the merge point 202. Besides this, another automobile 102 may be traveling in the lane 203 at the outside of the merge point 202.

As an example of this case, the driver of the vehicle 100 must verify the front of the vehicle 100 in order to confirm whether or not another automobile 101 is trying to cut ahead in the front of the vehicle 100. Even if another automobile 101 enters in the rear of the vehicle 100, the front of the vehicle 100 must be verified in order to confirm whether or not that the other automobile 101 has not entered at a dead angle (blind spot) when that other automobile 101 is a two-wheeled vehicle.

In contrast, as shown in FIG. 3, when the vehicle 100 enters the merge point 202 from the road 201, there is a chance that the vehicle 100 might enter the merge point 202 from the front of the other automobile 101 that is traveling in the merge point 202. Another automobile 102 is also traveling in the lane 203 at the outside of the merge point 202. In this case, the driver must verify the right side of the vehicle 100 in order to confirm whether or not the other automobile 101 should be permitted to move ahead of the vehicle 100. Consequently, when the vehicle 100 enters the merge point 202, it may be necessary for the driver of the vehicle 100 to verify the side of the vehicle 100 (left side in FIG. 2 and right side in FIG. 3). Thus, the merge point 202 is included as one of the predetermined road regions that require an image display to assist the driver in passing through the predetermined road region or the merge point 202.

Figure 4:
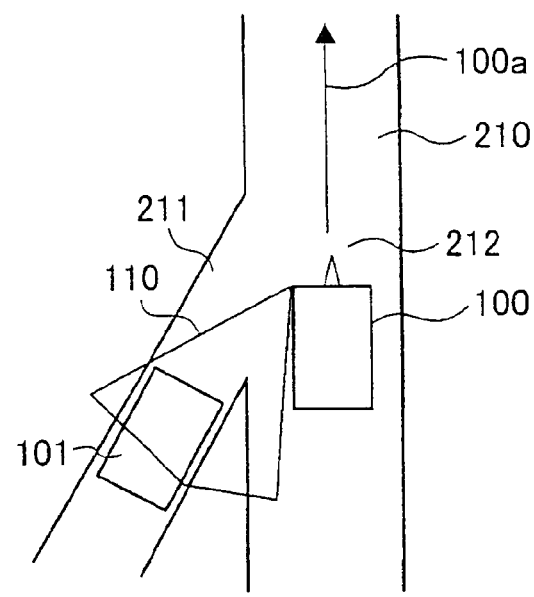
FIG. 4 is a top plan view showing an example of one of the predetermined regions that require an image display of the surrounding area of the peripheral side of the vehicle.

As shown in FIG. 4, a road 210 (e.g., main road or principal trunk road of an expressway) and a road 211 that merges with the road 210 (e.g., acceleration lane that merges a main road of an expressway or a feeder road that merges with a principal trunk road) define a merge point 212. This merge point 212 is also included as one of the predetermined road regions that require an image display to assist the driver in passing through the predetermined road region. The reason the merge point 212 is included in the predetermined road regions that require an image display is identical to the reason the merge point 202, shown in FIG. 2, is included in the predetermined road regions that require an image display.

Figure 5:
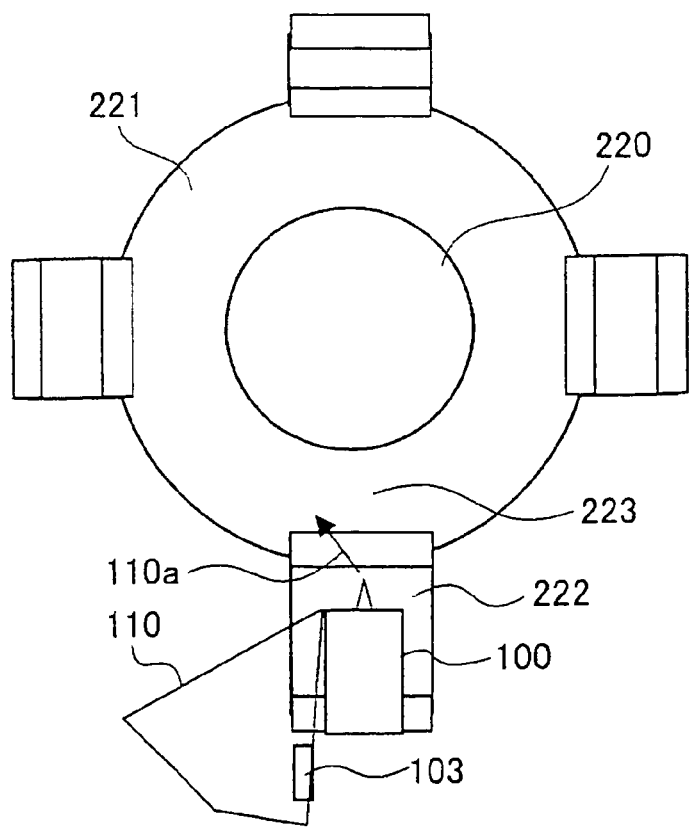
FIG. 5 is a top plan view showing an example of one of the predetermined regions that require an image display of the surrounding area of the peripheral side of the vehicle.

Furthermore, as shown in FIG. 5, a traffic circle or rotary is also included as one of the predetermined road regions that require an image display to assist the driver in passing through the predetermined road region. The traffic circle or rotary has a road 221 around the periphery of a rotary unit 220 and a merge point 223 with a road 222 that merges with the road 221. Each merge point of the traffic circle or rotary is included in as one of the predetermined road regions that require an image display. The reason this merge point 223 is included in as one of the predetermined road regions that require an image display is as follows. Namely, as shown in FIG. 5, when the vehicle 100 enters the merge point 223 (indicated by an arrow 110a), there is a possibility that another vehicle (in particular a two-wheeled vehicle 103) may enter the merge point 223 from the rear of the vehicle 100. In this case, the driver of the vehicle 100 must verify the side of the vehicle 100 in order that, for example, the automobile does not entangle the two-wheeled vehicle 103. Therefore, in this case, an image of the side of the vehicle 100 (left side in FIG. 5) must be displayed in order for the driver to perform this verification. Thus, a traffic circle or rotary with its merge points are included in the predetermined road regions that require an image display.

In addition, when a specific route is uniquely specified by road configuration for the vehicle 100 that passes through one of the predetermined road regions shown in FIGS. 2~5, the startup imaging determination unit 13 is configured and arranged to determine which of the images from the cameras 11a and 11b should be displayed prior to the vehicle 100 entering the predetermined road region. For each of the predetermined road regions shown in FIGS. 2~5, the startup imaging determination unit 13 is preferably configured and arranged to determine the image displaying location d1 based on the particulars of the predetermined road regions. In other words, the startup imaging determination unit 13 can be configured and arranged to determine the image displaying location d1 based on the type of predetermined road region such that certain types of merge points have different distance for the image displaying location d1. For example, the distance of the image displaying location d1 from the predetermined road region for a highway is different from the distance of the image displaying location d1 from the predetermined road region for a local road. Of course, in simpler version of the present invention, the distance of the image displaying location d1 from the predetermined road region can be same regardless of the particulars of the predetermined road region. In any event, the driver can view the peripheral side areas of the vehicle 100 prior to entering the merge point 202 (the predetermined road region). In FIG. 10, the beginning of the merge point 202 (the predetermined road region) is indicated by the startup location d2. At the startup location d2, the monitor 14 starts displaying one or more images that are determined by the particulars of the predetermined road region that the vehicle has entered. In other words, the image(s) on the monitor 14 can either remain the same, shift to new image(s) or the monitor 14 can be turned off depending on the particulars of the predetermined road region that the vehicle 100 has entered.

Figure 6:
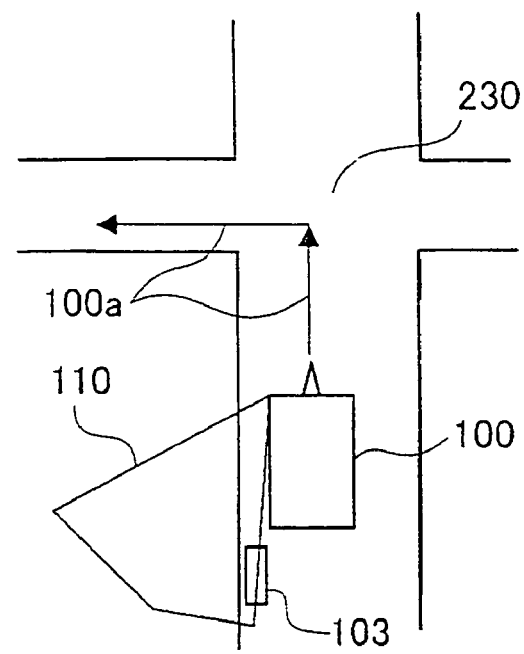
FIG. 6 is a top plan view showing an example of one of the predetermined regions that require an image display of the surrounding area of the peripheral side of the vehicle.

As shown in FIG. 6, an intersection 230 is included in one of the predetermined road regions that require an image display. The reason the intersection 230 is included in one of the predetermined road regions that require an image display is as follows. Namely, as shown in FIG. 6, when the vehicle 100 enters the intersection 230, there is a possibility that another vehicle (in particular a two-wheeled vehicle 103) may enter the intersection 230 from the rear of the vehicle 100. In this case, the driver of the vehicle 100 must verify the side of the vehicle 100 in order that, for example, the automobile does not entangle the two-wheeled vehicle 103. Therefore, in this case, an image of the side of the vehicle 100 (left side in FIG. 6) must be displayed in order for the driver to perform this verification. Thus, the intersection 230 is included in one of the predetermined road regions that require an image display.

Figure 7:
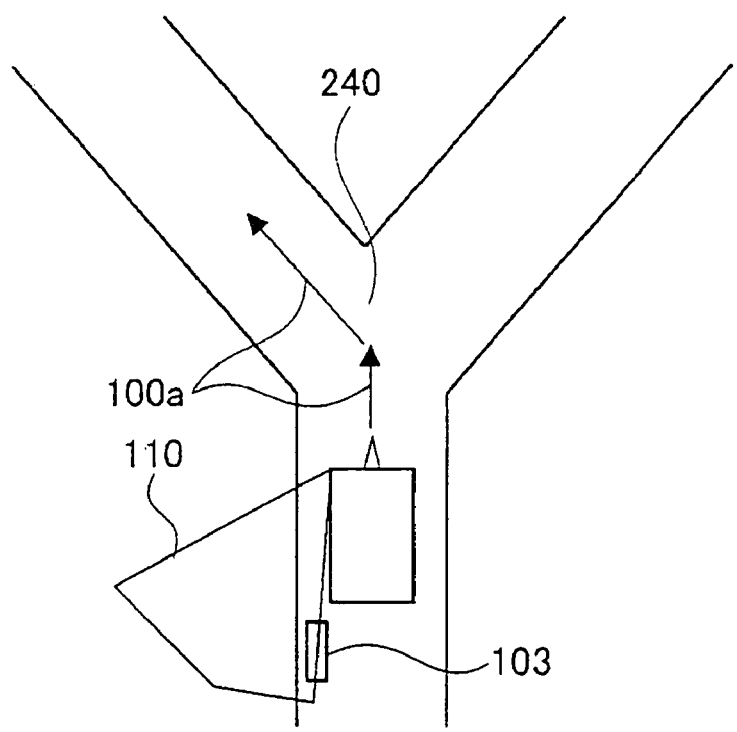
FIG. 7 is a top plan view showing an example of one of the predetermined regions that require an image display of the surrounding area of the peripheral side of the vehicle.

In addition, as shown in FIG. 7, a branch point 240, where roads branch out to multiple branch roads, is included in one of the predetermined road regions that require an image display. The reason the branch point 240 is included in the region that requires an image display is as follows. Namely, as shown in FIG. 7, when the vehicle 100 enters the branch point 240, there is a possibility that another vehicle (in particular a two-wheeled vehicle 103) may enter the branch point 240 from the rear of the vehicle 100. In this case, the driver of the vehicle 100 must verify the side of the vehicle 100 in order that, for example, the automobile does not entangle the two-wheeled vehicle 103. Therefore, for this case, an image of the side of the vehicle 100 (left side in FIG. 7) must be displayed in order for the driver to perform this verification. Thus, the branch point 240 is included in one of the predetermined road regions that require an image display.

Figure 8:
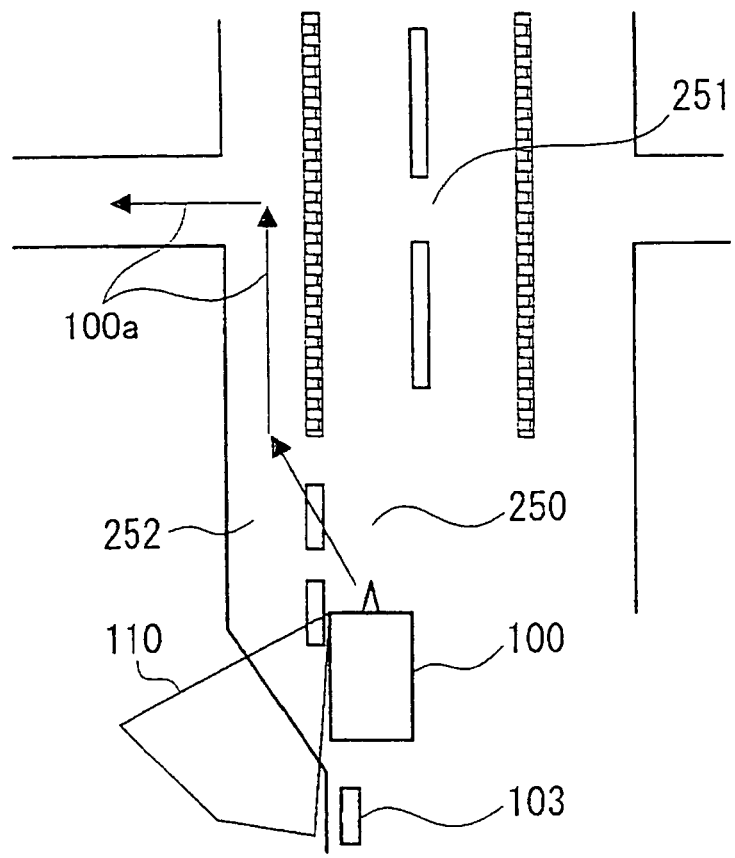
FIG. 8 is a top plan view showing an example of one of the predetermined regions that require an image display of the surrounding area of the peripheral side of the vehicle.

In addition, as shown in FIG. 8, a branch point 250 between an overpass 251 and a minor road 252 that extends to the side of the overpass 251 is included in one of the predetermined road regions that require an image display. The reason the branch point 250 is included in one of the predetermined road regions that require an image display is as follows. Namely, as shown in FIG. 8, when the vehicle 100 enters the branch point 250, there is a possibility that another vehicle (in particular a two-wheeled vehicle 103) may enter the branch point 250 from the rear of the vehicle 100. In this case, the driver of the vehicle 100 must verify the side of the vehicle 100 in order that, for example, the automobile does not entangle the two-wheeled vehicle 103 when entering the minor road 252 from the branch point 250. Therefore, for this case, an image of the side of the vehicle 100 (left side in FIG. 8) must be displayed in order for the driver to perform this verification. Thus, the branch point 250 is included in one of the predetermined road regions that require an image display.

Figure 9:
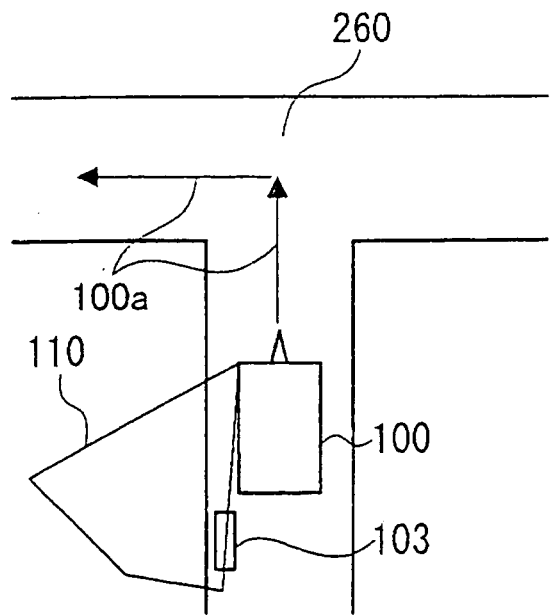
FIG. 9 is a top plan view showing an example of one of the predetermined regions that require an image display of the surrounding area of the peripheral side of the vehicle.
Figure 10:
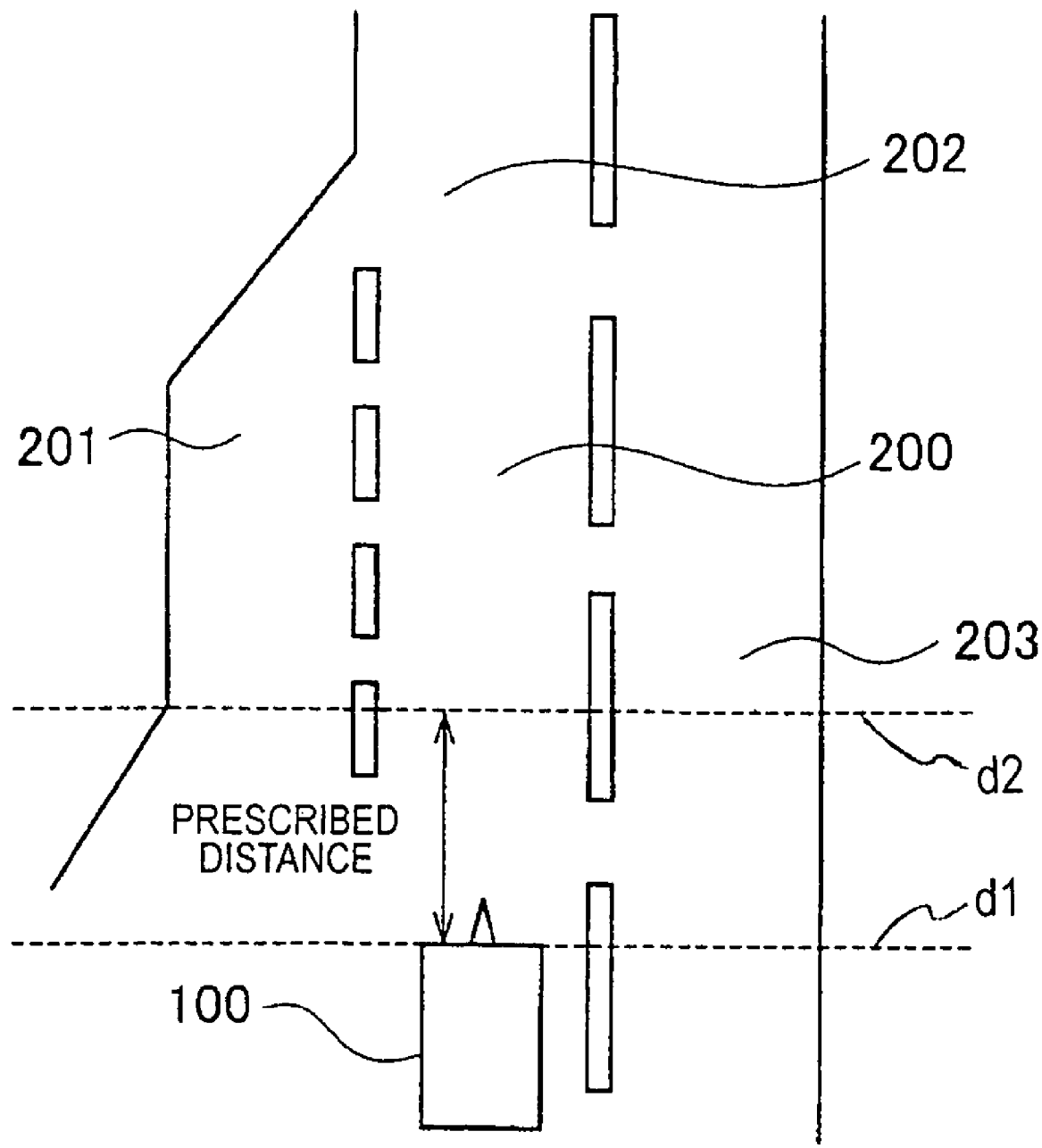
FIG. 10 is a top plan view showing starting and stopping locations based on a prescribed distance for displaying an image of the surrounding area of the peripheral side of the vehicle prior to entering a predetermined region that require an image display of the surrounding area of the vehicle.

In addition, as shown in FIG. 9, a T-intersection 260 is included in one of the predetermined road regions that require an image display. The reason the T-intersection 260 is included in one of the predetermined road regions that require an image display is as follows. Namely, as shown in FIG. 9, when the vehicle 100 enters the T-intersection 260, there is a possibility that another vehicle (in particular a two-wheeled vehicle 103) may enter the T-intersection 260 from the rear of the vehicle 100. In this case, the driver of the vehicle 100 must verify the side of the vehicle 100 in order that, for example, the automobile does not entangle the two-wheeled vehicle 103 when turning to the left on the T-intersection 260. Therefore, in this case, an image of the side of the vehicle 100 (left side in FIG. 9) must be displayed in order for the driver to perform this verification. Thus, the T-intersection 260 is included in one of the predetermined road regions that require an image display.

Moreover, when a specific route is not uniquely specified by road configuration specified for the vehicle 100, but a specific route is set as in FIGS. 6~9, then the startup imaging determination unit 13 still determines which of the images from the cameras 11a and 11b should be displayed prior to the vehicle 100 entering the predetermined road region. In this case, the determination of the startup imaging determination unit 13 is based on a determination that the vehicle 100 will most likely pass through the predetermined road regions and the driver will most likely take a certain action such as turn right or left in view of the map information, the route information and the current vehicle location. In other words, the startup imaging determination unit 13 determines that the vehicle 100 will most likely follow the guide route indicated by the arrows 100a in FIGS. 6~9.

Figure 11:
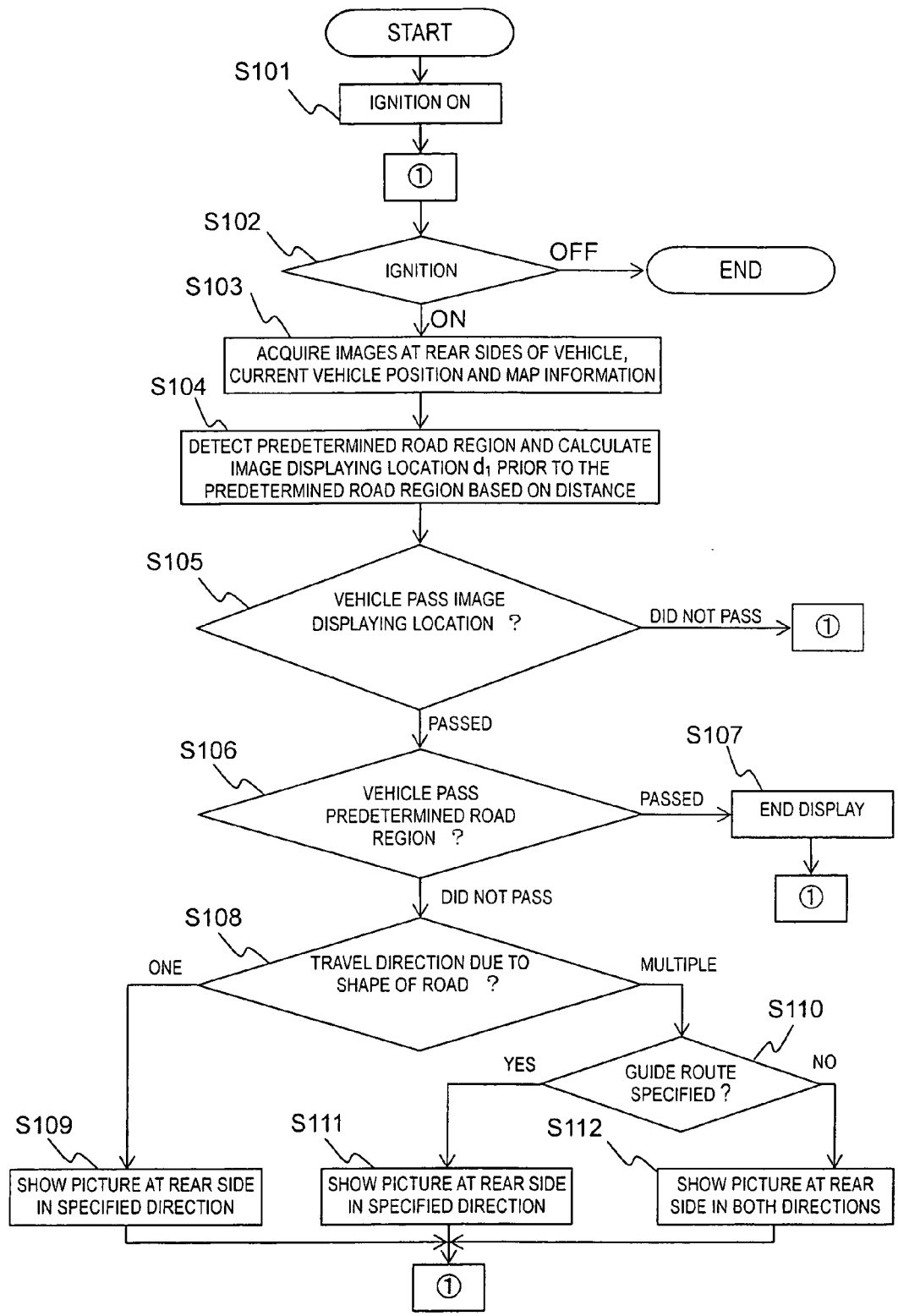
FIG. 11 is a flowchart showing the processing procedure according to the vehicle surrounding area imaging system.

Next, FIG. 11 uses a flowchart to describe the processing executed by the startup imaging determination unit 13 of the vehicle surrounding area imaging system 1a according to the present invention.

In step S101 of FIG. 11, when the ignition of the vehicle 100 is turned ON, the startup imaging determination unit 13, shown in FIG. 1, turned on and the program continues to run as along as the ignition in the ON state. As a result, the processing by the startup imaging determination unit 13 proceeds to step S102, where the startup imaging determination unit 13 determines if the ignition is maintained in either the ON state or the OFF state. When the ignition is maintained in the OFF state, the vehicle surrounding area imaging system 1a ends the processing. When the ignition is maintained in the ON state, the vehicle surrounding area imaging system 1a proceeds to step S103.

In step S103, the cameras 11a and 11b photograph the peripheral regions at the sides of the vehicle 100 to acquire image information. Then, this acquired image information is output to the startup imaging determination unit 13, but not displayed on the monitor 14 until it is determine to be needed by the driver. Also in step S103, the navigation system 12 acquires current position information of the vehicle 100 and then acquires map information that includes the current vehicle position. Next, the acquired current position information and the map information are output to the startup imaging determination unit 13.

Additionally, when the route of the vehicle 100 is set, the navigation system 12 generates route information for this set route and outputs that information to the startup imaging determination unit 13.

Next, in step S104, the startup imaging determination unit 13 detect the next predetermined road region that requires an image display from the periphery around the vehicle 100 based on the current vehicle position information and the map information provided from the navigation system 12. Also calculates the imaging displaying location d1 for starting the monitor 14 to display one or more of the images from the cameras 11a and 11b.

Next, in step S105, the startup imaging determination unit 13 determines if the vehicle 100 has passed the imaging displaying location d1 for starting the monitor 14 to display one or more of the images from the cameras 11a and 11b based on the current vehicle position information and the map information provided from the navigation system 12. As a result, when the vehicle 100 passed the imaging displaying location d1, then the process will proceed to step S106. If the vehicle 100 did not pass the imaging displaying location d1, then the process will return to step S102.

In step S106, the startup imaging determination unit 13 determines whether or not the vehicle 100 has passed through the predetermined road region that requires an image display based on the current position information and map information provided from the navigation system 12. As a result, when the vehicle 100 passed the predetermined road region, the process will proceed to step S107. If the vehicle 100 did not pass the predetermined road region, the process will proceed to step S108.

In step S107, the startup imaging determination unit 13 stops the output of image information to the monitor 14 based on the startup imaging determination unit 13. Consequently, the monitor 14 stops the display of image information based on the startup imaging determination unit 13. Thereafter, the vehicle surrounding area imaging system 1a returns to step S102. However, the monitor 14 can still display image(s) from the cameras 11a and 11b, if needed and desired, such that the image(s) from the cameras 11a and 11b are turned off after a predetermined time or distance from exiting the predetermined road region based on the current vehicle position information and the map information provided from the navigation system 12.

In step S108, the startup imaging determination unit 13 determines whether or not the route of the vehicle 100 is uniquely specified by road configuration in the predetermined road region that requires an image display based on the current position information and the map information provided from the navigation system 12. In other words, in step S108, the startup imaging determination unit 13 determines whether or not there is only one route for the vehicle 100 or if there are multiple routes for the vehicle 100 through a predetermined road region. As a result, when a specific route is uniquely specified by the road configuration, then the process proceeds to step S109. When the route is not uniquely specified (for example, as shown in FIGS. 6~9), then the process proceeds to step S110.

In step S109, the startup imaging determination unit 13 outputs the image information to the monitor 14 that corresponds to the specified route from among image information provided from the cameras 11a and 11b. For example in FIG. 2, only the image information on the left side of the vehicle 100 is necessary. Thus, when vehicle 100 approaches a predetermined road region such as in FIG. 2, only the image information provided from the camera 11a is outputted to the monitor 14.

Next, the monitor 14 displays the image information provided from the startup imaging determination unit 13. Because of this, the driver of the vehicle 100 views and verifies the displayed image information thereby making it possible to know the condition at the sides of the automobile that correspond to the route of the vehicle 100.

In contrast, when the route is not uniquely specified, the startup imaging determination unit 13 determines whether or not route information has been provided from the navigation unit 12 in step S110. As a result, when the route information has been provided, the process proceeds to step S111. If the route information has not been provided, the process proceeds to step S112.

In step S111, the startup imaging determination unit 13 recognizes the specified route of the vehicle 100 based on the route information provided from the navigation system 12 and then outputs image information that corresponds to the recognized route, from among image information provided from the cameras 11a and 11b to the monitor 14. For example, as shown in FIG. 6, when the route of the vehicle 100 is set to the route indicated by the arrows 100a, the image information acquired by camera 11a, from among image information provided from the cameras 11a and 11b, will output to the monitor 14.

Next, the monitor 14 displays the image information provided from the startup imaging determination unit 13. Because of this, the driver of the vehicle 100 views and verifies the displayed image information thereby making it possible to know the condition at the sides of the automobile that correspond to the route of the vehicle 100. Thereafter, the vehicle surrounding area imaging system 1a returns to step S102.

In step S112, the startup imaging determination unit 13 outputs image information provided from the cameras 11a and 11b to the monitor 14. In other words, image information of both sides of the vehicle 100 will output to the monitor 14.

Next, the monitor 14 displays the image information provided from the startup imaging determination unit 13. Because of this, the driver of the vehicle 100 views and verifies the displayed image information thereby making it possible to know the condition at both sides of the vehicle 100. Thereafter, the vehicle surrounding area imaging system 1a returns to step S102.

As described above, in the first embodiment, when the vehicle surrounding area imaging system 1a detects a predetermined road region that requires an image display, image information acquired by the cameras 11a and 11b will display before the vehicle 100 enters this detected predetermined road region that requires an image display (refer to step S105~step S112 shown in FIG. 11).

This makes it possible for the driver of the vehicle 100 to view and verify image information of the sides of the vehicle 100 before the vehicle 100 enters a predetermined road region that requires an image display, namely, before the driver focuses on driving actions in the region that requires an image display. Consequently, the driver can more easily view and verify image information of the sides of the vehicle 100 compared to conventional technology that determines whether or not a predetermined road region that requires an image display exists based on the driving actions of the driver. In other words, the driver can more easily verify the condition at the sides of the vehicle 100.

Furthermore, because the vehicle surrounding area imaging system 1a determines whether or not a predetermined road region that requires an image display exists based on map data, a more accurate determination can be made as to whether or not a region that requires an image display exists compared to conventional technology. This makes it possible to display images of the sides of the vehicle 100 with even more accuracy.

As shown in FIGS. 2–4, the merge points 202 and 212, where multiple roads merge, are included in the predetermined road region that requires an image display. This makes it possible for the driver to view and verify image information of the sides of the vehicle 100 before the driver focuses on driving actions in the merge points 202 and 212 (for example, as shown in FIG. 3, driving actions that enter the automobile onto the road 200 after verifying the movement of the other automobile 101).

As shown in FIG. 5, a road 221 around the periphery of a rotary unit 220 and a merge point 223 with a road 222 are included in the predetermined road regions that require an image display. This makes it possible for the driver to view and verify image information of the sides of the vehicle 100 before the driver focuses on driving actions at the merge point 223 (for example, driving actions that enter the automobile onto the road 221 after verifying the movement of a two-wheeled vehicle 103).

As shown in FIG. 6, an intersection 230 is included in the region that requires an image display. This makes it possible for the driver to view and verify image information of the sides of the vehicle 100 before the driver focuses on driving actions at the intersection 230 (for example, driving actions that turn the automobile left onto the intersection 230 after verifying the movement of a two-wheeled vehicle 103).

As shown in FIG. 7, a branch point 240 included in the predetermined road regions that require an image display. This makes it possible for the driver to view and verify image information of the sides of the vehicle 100 before the driver focuses on driving actions at the branch point 240 (for example, driving actions that turn the automobile onto a left branch road from the branch point 240 after verifying the movement of a two-wheeled vehicle 103).

As shown in FIG. 8, a branch point 250 where the road branches to a minor road 252 that extends to an overpass 251 and to the side of the overpass 251 is included in the predetermined road regions that require an image display. This makes it possible for the driver to view and verify image information of the sides of the vehicle 100 before the driver focuses on driving actions at the branch point 250 (for example, driving actions that enter the automobile onto the minor road 252 after verifying the movement of a two-wheeled vehicle 103).

As shown in FIG. 9, a T-intersection 260 is included in the predetermined road regions that require an image display. This makes it possible for the driver to view and verify image information of the sides of the vehicle 100 before the driver focuses on driving actions at the T-intersection 260 (for example, driving actions that turn the automobile left onto the T-intersection 260 after verifying the movement of a two-wheeled vehicle 103).

Furthermore, when the route of the vehicle 100 is uniquely specified in one of the predetermined road regions that require an image display, the vehicle surrounding area imaging system 1a displays image information of the side of the automobile corresponding to the specified route from among image information acquired by the cameras 11a and 11b (refer to step S109 shown in FIG. 11). This makes it possible for the driver to only view and verify image information that requires viewing.

In addition, when the route of the vehicle 100 is not uniquely specified in a predetermined road region that requires an image display and the navigation system 12 has not set a route for the vehicle 100, the vehicle surrounding area imaging system 1a displays image information acquired by the cameras 11a and 11b, namely, image information of both sides of the vehicle 100 (refer to step S112 shown in FIG. 11). This makes it possible for the driver to reliably view and verify image information of the sides of the vehicle 100 even if a route for the vehicle 100 is not uniquely specified in a predetermined road region that requires an image display.

When the navigation system 12 has set a route for the vehicle 100, the vehicle surrounding area imaging system 1a displays image information of the sides corresponding to the set route from among image information acquired by the cameras 11a and 11b. This makes it possible for the driver to only view and verify image information that requires viewing even if a route for the vehicle 100 is not uniquely specified in a predetermined road region that requires an image display.

When the vehicle 100 passes an image displaying location that is a prescribed distance prior to the predetermined road region, the vehicle surrounding area imaging system 1a displays image information acquired by the cameras 11a and 11b (refer to step S105~Step S112 shown in FIG. 11). Consequently, since the vehicle surrounding area imaging system 1a reliably displays image information of the sides of the vehicle 100 before the vehicle 100 enters into a predetermined road region that requires an image display, the driver can reliably view and verify that image information before the vehicle 100 enters into a predetermined road region that requires an image display.

Second Embodiment

Figure 12:
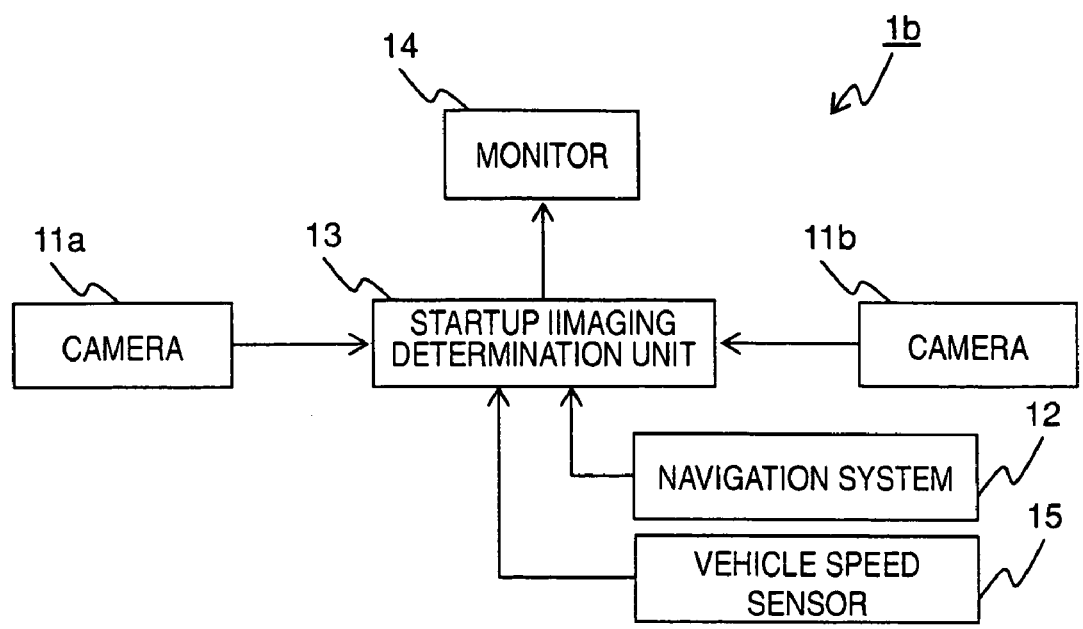
FIG. 12 is a block diagram showing main components of a vehicle surrounding area imaging system related to another embodiment of the present invention.
Figure 13:
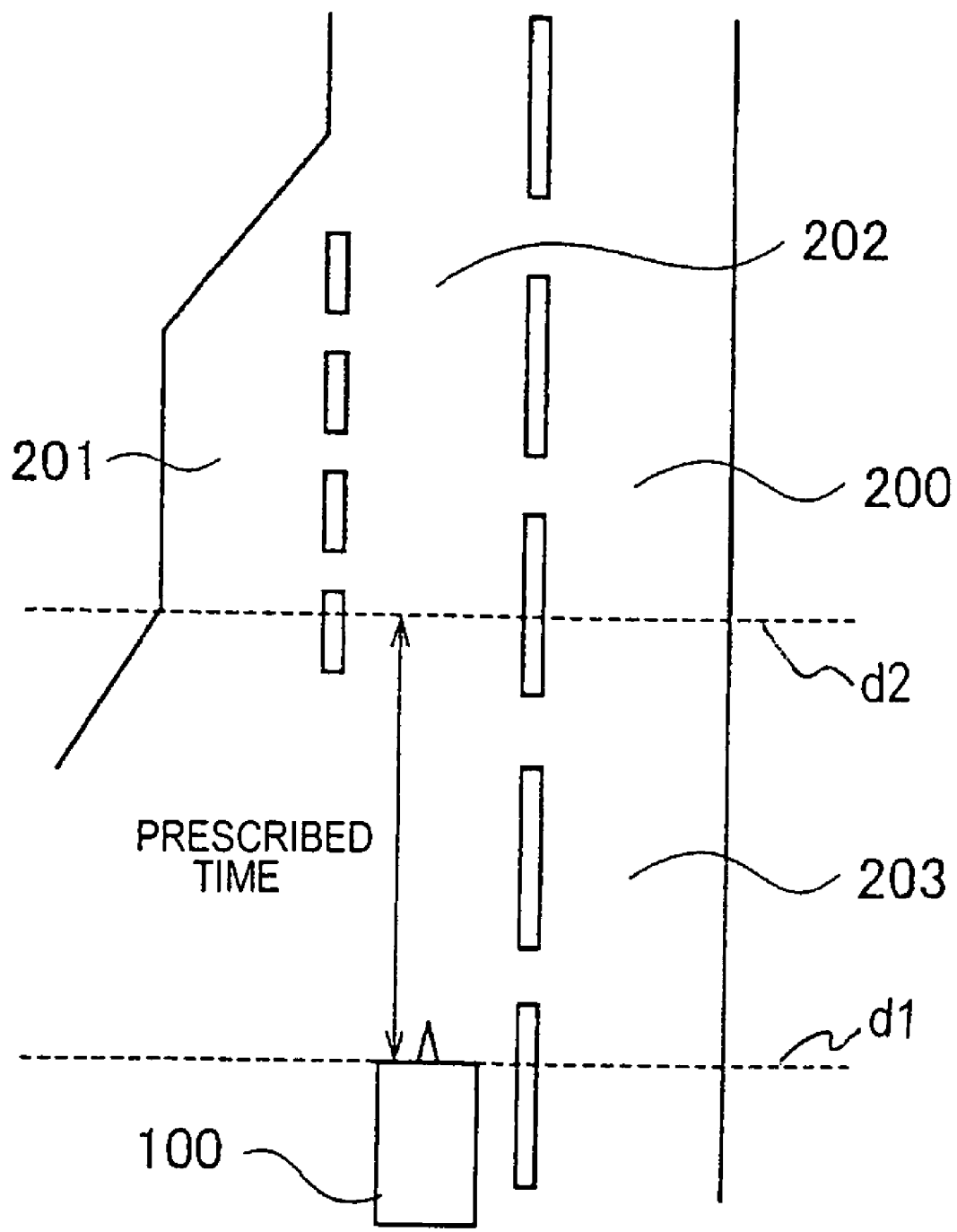
FIG. 13 is a top plan view showing starting and stopping locations based on a prescribed time for displaying an image of the surrounding area of the peripheral side of the vehicle prior to entering a predetermined region that require an image display of the surrounding area of the vehicle.

Referring now to FIGS. 12 and 13, a startup determination system in accordance with a second embodiment will now be explained (corresponding to claim 12). In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

First, the main components of the vehicle surrounding area imaging system 1b related to the second embodiment and the principal features of the compositional elements will be described referring to FIGS. 12 and 13. In FIG. 12, a block diagram shows the composition of the vehicle surrounding area imaging system 1b. FIG. 13 shows a top plan view of a predetermined road condition in which the image displaying location is based on a prescribed time.

As shown in FIG. 12, the vehicle surrounding area imaging system 1b basically comprises a pair of cameras 11a and 11b, a navigation system 12, a startup imaging determination unit 13, a monitor 14 and a vehicle speed sensor 15. The cameras 11a and 11b form an image acquiring device that is configured and arranged to photograph peripheral side areas of the vehicle 100 to acquire images of the peripheral side areas of the vehicle 100 that include the so called blind spot that is not covered by the mirrors of the vehicle. The navigation system 12 forms a position detecting device that is configured and arranged to a current position of the vehicle 100 that detects the current position of the vehicle 100. The startup imaging determination unit 13 forms a startup imaging determination device that is configured and arranged to detect predetermined road regions that requires an image to be displayed of the periphery around the vehicle 100 based on the current position detected by the navigation system 12 (position detecting device) as well as map information. The monitor 14 forms an image displaying device that is configured and arranged to display the images acquired by the cameras 11a and 11b (image acquiring device). The vehicle speed sensor 15 forms vehicle speed detecting device is configured and arranged to detect the current vehicle speed. Further, the vehicle surrounding area imaging system 1b is installed in the vehicle 100 shown in FIG. 2 in like manner to the vehicle surrounding area imaging system 1a related to the first embodiment.

Because of this, the vehicle surrounding area imaging system 1b comprises compositional elements identical to the vehicle surrounding area imaging system 1a and in addition comprises the vehicle speed sensor 15. Consequently, only the areas different from the vehicle surrounding area imaging system 1a will be described for the vehicle surrounding area imaging system 1b.

The vehicle speed sensor 15 detects the speed of the vehicle 100, generates speed information related to the detected speed and then outputs that information to the startup imaging determination unit 13.

The startup imaging determination unit 13 detects a predetermined road region that requires an image display that requires a display of an image of the side of the automobile from the periphery around the vehicle 100 based on the current position information and map information provided from the navigation system 12.

As a result, when a predetermined road region that requires an image display is detected, the startup imaging determination unit 13 measures the distance the vehicle 100 traveled in a prescribed time (for example, 3 seconds) based on speed information provided from the vehicle speed sensor 15. Then, as shown in FIG. 13, the startup imaging determination unit 13 detects an image displaying location d1 that is a prescribed time prior to the startup location d2. Thus, the image displaying location d1 is separated by a measured distance away from the startup location d2 of the predetermined road region that requires an image display that was detected based on map information provided from the navigation system 12 (refer to FIG. 13).

Then, the startup imaging determination unit 13 determines whether or not the vehicle 100 has passed the image displaying location d1 based on the current position information and map information provided from the navigation system 12. As a result, when the vehicle 100 passed the image displaying location d1, the startup imaging determination unit 13 determines whether or not a route is uniquely specified in the predetermined road region that requires an image display. As a result, when a route is uniquely specified, the startup imaging determination unit 13 outputs to the monitor 14 the image information corresponding to the specified route.

In contrast, when a route is not specified and route information is provided from the navigation system 12, the startup imaging determination unit 13 recognizes the route of the vehicle 100 based on that route information and outputs to the monitor 14 the image information corresponding to the specified route.

Further, when a route is not specified and route information is not provided from the navigation system 12, the startup imaging determination unit 13 outputs to the monitor 14 the image information provided from the cameras 11a and 11b. In other words, the startup imaging determination unit 13 outputs image information of both sides of the vehicle 100 to the monitor 14.

Figure 14:
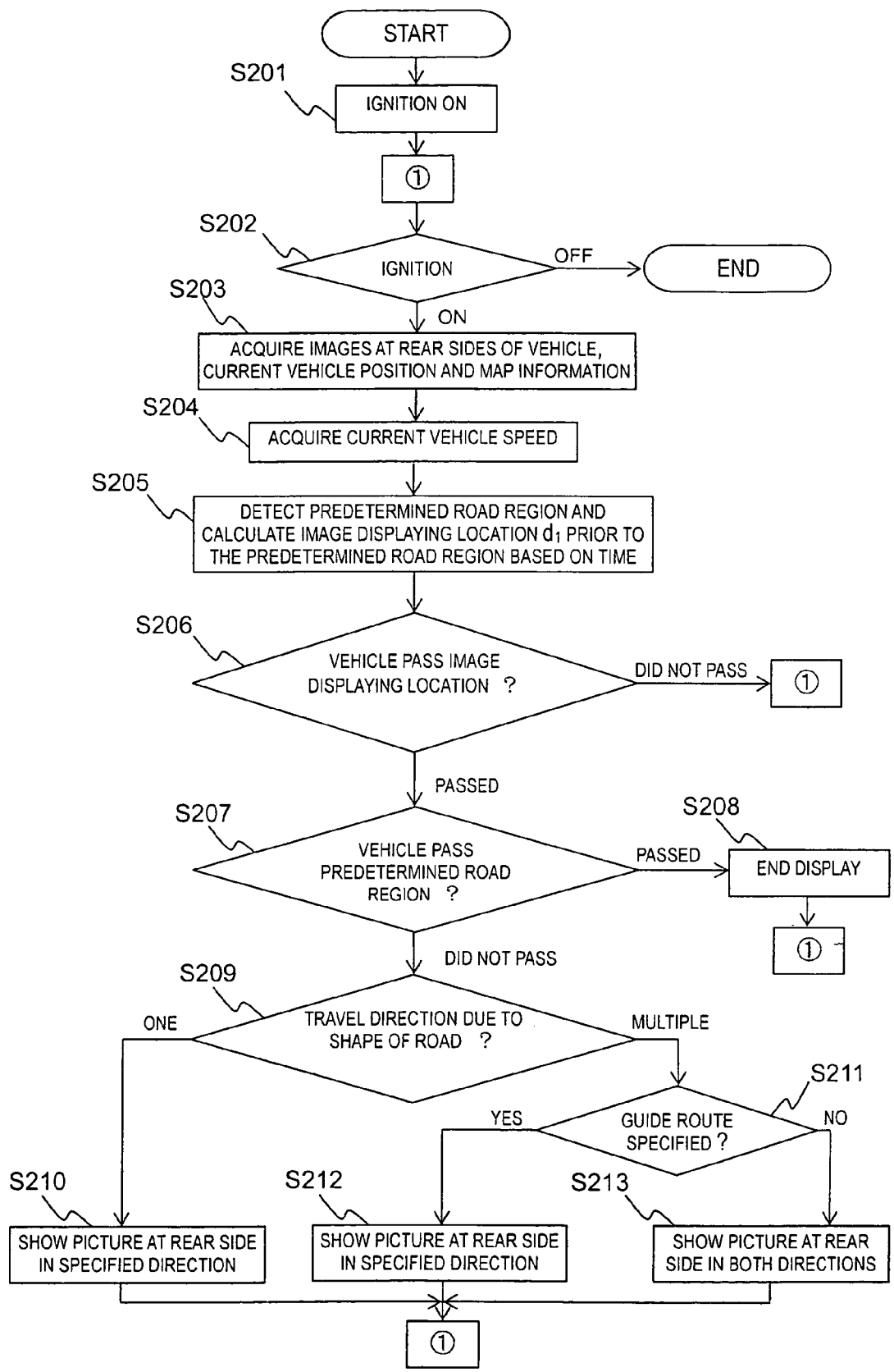
FIG. 14 is a flowchart showing the processing procedure according to the vehicle surrounding area imaging system.

Next, the flowchart shown in FIG. 14 will be used to describe the processing procedure according to the vehicle surrounding area imaging system 1b.

In steps S201~S203 in FIG. 14, the vehicle surrounding area imaging system 1b performs processing identical to steps S101~S103 in FIG. 11.

Next, in step S204, the vehicle speed sensor 15 detects the speed of the vehicle 100, generates speed information related to the detected vehicle speed and then outputs that information to the startup imaging determination unit 13.

Next in step S205, the startup imaging determination unit 13 detects the predetermined road region that requires an image display from the periphery around the vehicle 100 based on the current position information and map information provided from the navigation system 12. Also, in step S205, the startup imaging determination unit 13 measures the distance the vehicle 100 traveled in a prescribed time based on speed information provided from the vehicle speed sensor 15. From this data, as shown in FIG. 13, the startup imaging determination unit 13 calculates the imaging displaying location d1 for starting the monitor 14 to display one or more of the images from the cameras 11a and 11b based on map information provided from the navigation system 12.

Then, in step S206, the startup imaging determination unit 13 determines if the vehicle 100 has passed the imaging displaying location d1 for starting the monitor 14 to display one or more of the images from the cameras 11a and 11b based on the current vehicle position information and the map information provided from the navigation system 12. As a result, when the vehicle 100 passed the imaging displaying location d1, then the process will proceed to step S207. If the vehicle 100 did not pass the imaging displaying location d1, then the process will return to step S202. Thus, in this embodiment, the system can determine the amount of time that the monitor 14 is displaying the image prior to the vehicle entering the predetermined road region.

In steps S207~S213, the vehicle surrounding area imaging system 1b performs processing identical to steps S106~S112 in FIG. 11.

As described above, in the second embodiment, the following effects can be obtained in addition to the effects identical to the first embodiment that could be obtained.

In other words, when a predetermined road region that requires an image display is detected, the vehicle surrounding area imaging system 1b measures the distance the vehicle 100 traveled in a prescribed time based on the speed of the vehicle 100 detected by the vehicle speed sensor 15. Then, the vehicle surrounding area imaging system 1b detects the imaging displaying location d1 for starting the monitor 14 to display one or more of the images from the cameras 11a and 11b before entering the next predetermined road region that requires an image display. In other words, when the vehicle 100 passed the imaging displaying location d1, the vehicle surrounding area imaging system 1b displays image information acquired by the cameras 11a and 11b.

Consequently, because the vehicle surrounding area imaging system 1b can display image information of the sides of the vehicle 100 before the vehicle 100 enters into a predetermined road region that requires an image display, the driver can view and verify that image information before the prescribed time in which the vehicle 100 enters into the predetermined road region that requires an image display. To put in different terms, the vehicle surrounding area imaging system 1b can reliably ensure the prescribed time regardless of the speed of the vehicle 100 as the time the driver views and verifies that image information. Further, the driver recognizing that prescribed time also makes it possible to recognize the time from the current time until the vehicle 100 enters into the predetermined road region that requires an image display.

Additionally, the predetermined road region that requires an image display shown in the first and second embodiments is an example of a predetermined road region that requires an image display. The predetermined road region that requires an image display can also include other locations such as a gas station or parking garage along roads.

As used herein to describe and claim the present invention, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Also, the term "configured" as used herein to describe and claim a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-133670. The entire disclosure of Japanese Patent Application No. 2003-133670 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle surrounding area imaging system comprising:
an image acquiring device configured and arranged to acquire images of peripheral side areas of a vehicle equipped with the vehicle surrounding area imaging system;
a position detecting device configured and arranged to detect a current vehicle position of the vehicle;
a startup imaging device configured and arranged to detect predetermined road regions that require one of the images of the peripheral side areas of the vehicle to be displayed based on the current vehicle position detected by the position detecting device as well as map information; and
an image displaying device configured and arranged to selectively display one of the images acquired by the image acquiring device before the vehicle enters into one of the predetermined road regions that was detected by the startup imaging device,
the startup imaging device being configured and arranged to determine an image displaying location that is a prescribed distance prior to one of the predetermined road regions that was detected, and
the image displaying device being configured and arranged to display selected ones of the images acquired by the image acquiring device when the vehicle is detected by the position detecting device to have passed the image displaying location.

2. The vehicle surrounding area imaging system as recited in claim 1, wherein
the startup imaging device is configured and arranged to detect a traffic merging area where at least two roads merge as at least one type of the predetermined road regions.

3. The vehicle surrounding area imaging system as recited in claim 1, wherein
the startup imaging device is configured and arranged to detect a traffic circle as at least one type of the predetermined road regions.

4. The vehicle surrounding area imaging system as recited in claim 1, wherein
the startup imaging device is configured and arranged to detect a traffic intersection where at least two roads merge as at least one type of the predetermined road regions.

5. The vehicle surrounding area imaging system as recited in claim 1, wherein
the startup imaging device is configured and arranged to detect a traffic branch point where at least two roads branch out as at least one type of the predetermined road regions.

6. The vehicle surrounding area imaging system as recited in to claim 1, wherein
the startup imaging device is configured and arranged to detect an overpass as at least one type of the predetermined road regions.

7. The vehicle surrounding area imaging system as recited in claim 1, wherein
the startup imaging device is configured and arranged to detect a T-intersection as at least one type of the predetermined road regions.

8. The vehicle surrounding area imaging system as recited in claim 1, wherein
the image displaying device is configured and arranged to selectively display one of the images of the peripheral side areas of the vehicle from among the images acquired by the image acquiring device based on road configuration through one of the predetermined road regions.

9. The vehicle surrounding area imaging system as recited in claim 1, wherein
the image displaying device is configured and arranged to display the images of both of the peripheral side areas of the vehicle acquired by the image acquiring device when a route of the vehicle is not uniquely specified.

10. The vehicle surrounding area imaging system as recited in claim 1, wherein the position detecting device is configured and arranged to set a specific travel route of the vehicle, and the image displaying device is configured and arranged to selectively display one of the images of the peripheral side areas of the vehicle from among images acquired by the image acquiring device based on the specific route that was set by the position detecting device.

11. The vehicle surrounding area imaging system as recited in claim 1, further comprising a vehicle speed detecting device configured and arranged to detect current vehicle speed of the vehicle, the startup imaging device being configured and arranged to determine a calculated distance that the vehicle travels in a prescribed time based on the current vehicle speed detected by the vehicle speed detecting device, and also determine an image displaying location that corresponds to the prescribed time prior to one of the predetermined road regions that that was detected, the image displaying device being configured and arranged to selectively display one of the images acquired by the image acquiring device when the vehicle passes the image displaying location to display at least one of the images for the prescribed time before the vehicle enters one of the predetermined road regions.

12. A vehicle surrounding area imaging system comprising:

image acquiring means for acquiring images of peripheral side areas of a vehicle equipped with the vehicle surrounding area imaging system;

position detecting means for detecting a current vehicle position of the vehicle;

startup image determination means for detecting predetermined road regions that require one of the images of the peripheral side areas of the vehicle to be displayed based on the current vehicle position detected by the position detecting means as well as map information; and image display means for selectively displaying images acquired by the image acquiring means before the vehicle enters into one of the predetermined road regions that was detected by the startup image determination means, the startup image determination means further including a function for determining an image displaying location that is a prescribed distance prior to one of the predetermined road regions that was detected, and the image displaying means further including a function for displaying selected ones of the images acquired by the image acquiring device when the vehicle is detected by the position detecting means to have passed the image displaying location.

13. A method of displaying images in a vehicle comprising:

acquiring images of peripheral side areas of the vehicle;

detecting a current vehicle position of the vehicle;

detecting predetermined road regions that require one of the images of the peripheral side areas of the vehicle to be displayed based on the current vehicle position and map information;

determining an image displaying location that is a prescribed distance prior to one of the predetermined road regions that was detected; and selectively displaying selected ones of the images of the peripheral side areas of the vehicle before the vehicle enters into one of the predetermined road regions when the vehicle is detected to have passed the image displaying location.

* * * * *